Patented Apr. 11, 1950

2,503,712

UNITED STATES PATENT OFFICE 2,503,712

MULTIPLE STEP PROCESS FOR PREPARING N,N' DIPHENYL P-PHENYLENE DIAMINE

Milton L. Clemens and James E. Magoffin, Kingsport, Tenn., assignors to Eastman Kodak Company, Rochester, N. Y., a corporation of New Jersey No Drawing. Application December 31, 1947, Serial No. 795,118

6 Claims. (Cl. 260—576)

This invention relates to N,N'diphenyl p-phenylene diamine, and more particularly to an improved multiple step method for producing this compound by reacting hydroquinone with aniline in the presence of a catalyst.

It is, of course, customary to prepare N,N'diphenyl p-phenylene diamine by the catalytic reaction of aniline with p-aminophenol or with hydroquinone. When the condensation of aniline with hydroquinone is employed, a catalyst such as phosphoric acid, aniline phosphate, or sodium dihydrogen phosphate is required.

When the p-aminophenol is condensed with aniline, a catalyst such as anhydrous hydrogen chloride is frequently employed. The latter process is not commercially desirable because of the rapid and extensive corrosion of the equipment. The former process requires long reaction times and produces at the most only 80–82% of the possible yield of N,N'diphenyl p-phenylene diamine. Another disadvantage of the phosphoric acid catalyst condensation of aniline with hydroquinone is that appreciable quantities of tar are produced in the course of the reaction.

An object, therefore, of this invention is to provide an improved process for the catalytic condensation of hydroquinone with aniline in which there is a higher yield of N,N'diphenyl p-phenylene diamine without the formation of substantial amounts of tarry by-products.

Another object is to provide a multiple step process for the preparation of N,N'diphenyl p-phenylene diamine whereby increased yields of the product are obtained. Other objects will appear hereinafter.

Heretofore, in preparing N,N'diphenyl p-phenylene diamine from hydroquinone and excess aniline, the reactants and catalyst were charged to a steel pressure reaction vessel, where heat is applied and the temperature raised to 180–250° C. The reaction is very rapid at first and the water formed is carried out as an azeotrope with some of the excess aniline. The reaction becomes progressively slower until finally it apparently becomes zero. At this point, the autoclave is discharged, excess aniline removed by distillation, and the product purified by fractional distillation at reduced pressure. Usually there is an appreciable quantity of N-phenyl p-aminophenol as well as small amounts of diphenylamine and tar. The N,N'diphenyl p-phenylene diamine must be separated from these other by-products before it is satisfactory for use.

Our invention is based on the discovery that the reaction takes place in two steps: (1) the condensation of aniline with hydroquinone to form N-phenyl p-aminophenol; (2) the condensation of N-phenyl p-aminophenol with aniline to form N,N'diphenyl p-phenylene diamine. We have further discovered that the optimum conditions for the reaction of step 1 are somewhat different from the optimum conditions for the reaction of step 2, so that if both reactions are attempted simultaneously, as is the customary procedure, the maximum yield cannot be obtained.

In accordance with our invention, the foregoing objects of the invention are attained by conducting the manufacture of N,N'diphenyl p-phenylene diamine in two separate reactions so that the optimum condition for each reaction can be maintained. An essential feature of our invention is the purification by vacuum distillation of the N-phenyl p-aminophenol before charging this compound to the second step of the reaction. It is a further feature of our invention to recycle that part of the N-phenyl p-aminophenol which is not converted to N,N'diphenyl p-phenylene diamine during the second reaction. We have found that an increase of 8 to 10 per cent yield of N,N'diphenyl p-phenylene diamine results.

It might appear to one not familiar with these reactions that an increased yield of N,N'diphenyl p-phenylene diamine could be obtained in a single step reaction by recycling of the unreacted N-phenyl p-aminophenol. This, however, is not the case for when N-phenyl p-aminophenol is added to an original charge of hydroquinone and aniline, it retards the reaction of hydroquinone with aniline to form additional N-phenyl p-aminophenol so that at the end of the usual reaction time a greater proportion of hydroquinone remains unchanged or is converted to tar. Thus we have found that recycling of the N-phenyl p-aminophenol is successful only in the second reaction step when the two reaction steps are carried out separately.

We have found that the same catalyst can be employed for both steps of our process, but that the ratio of catalysts to starting materials must be different for each step. Preferably the ratio of the catalyst in the first step is 0.25–0.35 gram per gram mol. of hydroquinone and in the second step is 1.8–2.3 grams per gram mol. of N-phenyl p-aminophenol. Any of the catalysts known to the art to catalyze the condensation reaction of hydroquinone and aniline can be employed in the practice of our invention. Particularly, success has been attained when employing the trialkyl phosphate catalysts which are disclosed in the copending application of H. G. Stone, Serial No. 792,831, filed of even date. Triethyl phosphate appears to be a very desirable catalyst for use in the present process. In general a 3 to 1 molar ratio of aniline to hydroquinone may be employed in the condensation. The following examples further illustrate the invention:

EXAMPLE 1

First step

A steel autoclave was charged with 110 grams of hydroquinone, 186 grams of aniline, and 0.3 gram of triethyl phosphate as a catalyst. This mixture was heated to 300° C. and maintained at that temperature for two hours. In the course of this time, 19.5 cc. of water was removed from the reaction azeotropically. The reaction mass was cooled and transferred to a distillation flask, whence the unreacted aniline was distilled out. The residue was then vacuum distilled at a pressure of 0.5 mm. and was found by analysis to be substantially a mixture of N-phenyl p-aminophenol and N,N'diphenyl p-phenylene diamine.

Second step

The above distillate, 180 grams, was again charged to the autoclave with 186 grams of aniline and 2 grams of triethyl phosphate. This mixture was heated to 300° C. for 4½ hours. After cooling, the mass was transferred to the still and the excess unreacted aniline removed by distillation. The residue was vacuum distilled and separated into the N-phenyl p-aminophenol and the N,N'diphenyl p-phenylene diamine fractions. Analyses showed that of the total 227.4 grams, 187.8 grams was N,N'diphenyl p-phenylene diamine, and 39.6 grams was N-phenyl p-aminophenol. Thus, a conversion of 63 per cent N-phenyl p-aminophenol to N,N'diphenyl p-phenylene diamine was obtained. Twenty-five per cent of the N-phenyl p-aminophenol was recovered.

The entire cycle was repeated five times, with the N-phenyl p-aminophenol being recycled in the second step of the reaction. An over-all yield of N,N'diphenyl p-phenylene diamine of 1138 grams was obtained. This is equivalent of 87.5 per cent theoretical yield.

EXAMPLE 2

First step

A steel autoclave was charged with 110 grams of hydroquinone, 186 grams of aniline, and 0.35 gram of trimethyl phosphate as a catalyst. This mixture was heated to 300° C. and maintained there for two hours. In the course of this time, 20 cc. of water was removed from the mass azeotropically. The reaction mass was cooled and transferred to a distillation flask, whence the aniline was distilled out. The residue was then vacuum distilled at a pressure of 0.5 mm. and was found by analysis to be substantially a mixture of N-phenyl p-aminophenol and N,N'diphenyl p-phenylene diamine.

Second step

The above distillate, 180 grams, was again charged to the autoclave with 186 grams of aniline and 3 grams of trimethyl phosphate. This mixture was heated to 300° C. for 4½ hours. After cooling, the mass was transferred to the still and the excess aniline removed by distillation. The residue was vacuum distilled and separated into the aminophenol and the phenylene diamine fractions. Analyses showed that of the total 225 grams, 185 grams was phenylene diamine, and 40 grams was aminophenol. Thus, a conversion of approximately 60 per cent aminophenol to phenylene diamine was obtained. Twenty-five per cent of the aminophenol was recovered.

The entire cycle was repeated five times, with the aminophenol being recycled in the second step of the reaction. An over-all yield of N,N'diphenyl p-phenylene diamine of 1130 grams was obtained. This is equivalent of 86.8 per cent theoretical yield.

We claim:

1. In a method of preparing N,N'diphenyl p-phenylene diamine which comprises condensing hydroquinone and aniline in an autoclave in the presence of a condensation catalyst azeotropically removing water therefrom during the reaction, cooling the reaction mixture, separating unconverted aniline by distillation, distilling the residue to obtain a distillate of N-phenyl p-aminophenol and N,N'diphenyl p-phenylene diamine, charging this distillate to an autoclave with additional aniline and catalyst, and further reacting the mixture, cooling the reaction products, distilling off unreacted aniline, and separating the residue by distillation into N-phenyl p-aminophenol and N,N'diphenyl p-phenylene diamine, the improvement which comprises increasing the product yield by conducting the first condensation in the presence of 0.25 to 0.35 gram of catalyst per gram mol of hydroquinone, and conducting the second condensation in the presence of 1.8 to 2.3 grams of catalyst per gram mol of N-phenyl p-aminophenol said catalyst being a trialkyl phosphate the alkyl groups of which have 1 to 3 carbon atoms.

2. In a method of preparing N,N'diphenyl p-phenylene diamine which comprises condensing hydroquinone and aniline in an autoclave in the presence of a condensation catalyst, azeotropically removing water therefrom during the reaction, cooling the reaction mixture, separating unconverted aniline by distillation, distilling the residue to obtain a distillate of N-phenyl p-aminophenol and N,N'diphenyl p-phenylene diamine, charging this distillate to an autoclave with additional aniline and catalyst, and further reacting the mixture, cooling the reaction products, distilling off unreacted aniline, and separating the residue by distillation into N-phenyl p-aminophenol and N,N'diphenyl p-phenylene diamine, the improvement which comprises increasing the product yield by conducting the first condensation in the presence of 0.25 to 0.35 gram of catalyst per gram mol of hydroquinone, and conducting the second condensation in the presence of 1.8 to 2.3 grams of catalyst per gram mol of N-phenyl p-aminophenol said catalyst being trimethyl phosphate.

3. In a method of preparing N,N'diphenyl p-phenylene diamine which comprises condensing hydroquinone and aniline in an autoclave in the presence of a condensation catalyst, azeotropically removing water therefrom during the reaction, cooling the reaction mixture, separating unconverted aniline by distillation, distilling the residue to obtain a distillate of N-phenyl p-aminophenol and N,N'diphenyl p-phenylene diamine, charging this distillate to an autoclave with additional aniline and catalyst, and further reacting the mixture, cooling the reaction products, distilling off unreacted aniline, and separating the residue by distillation into N-phenyl p-aminophenol and N,N'diphenyl p-phenylene diamine, the improvement which comprises increasing the product yield by conducting the first condensation in the presence of 0.25 to 0.35 gram of catalyst per gram mol of hydroquinone, and conducting the second condensation in the presence of 1.8 to 2.3 grams of catalyst per gram mol of N-phenyl p-aminophenol said catalyst being triethyl phosphate.

4. The method of claim 1 in which N-phenyl p-aminophenol is recycled during the second reaction.

5. The method of claim 2 in which N-phenyl p-aminophenol is recycled during the second reaction.

6. The method of claim 3, in which N-phenyl p-aminophenol is recycled during the second reaction.

MILTON L. CLEMENS.
JAMES E. MAGOFFIN.

REFERENCES CITED

The following references are of record in the file of this patent:

UNITED STATES PATENTS

| Number | Name | Date |
|---|---|---|
| 1,921,587 | Semon et al. | Aug. 9, 1933 |
| 1,980,102 | Semon | Nov. 6, 1934 |
| 2,029,642 | Semon | Feb. 4, 1936 |
| 2,238,320 | Hardman | Apr. 15, 1941 |